United States Patent
Britton et al.

(10) Patent No.: US 10,373,072 B2
(45) Date of Patent: Aug. 6, 2019

(54) COGNITIVE-BASED DYNAMIC TUNING

(71) Applicant: International Business Machines Corporation, Armonk, NY (US)

(72) Inventors: Diane Britton, Rhinebeck, NY (US); Reza Ghasemi, Bronxville, NY (US); Chon N. Lei, Poughkeepsie, NY (US); Robert Maher, Wappingers Falls, NY (US); Vanessa V. Michelini, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 769 days.

(21) Appl. No.: 14/991,063

(22) Filed: Jan. 8, 2016

(65) Prior Publication Data
US 2017/0200091 A1 Jul. 13, 2017

(51) Int. Cl.
*G06F 8/60* (2018.01)
*G06F 8/65* (2018.01)
*G06N 20/00* (2019.01)

(52) U.S. Cl.
CPC .............. *G06N 20/00* (2019.01); *G06F 8/60* (2013.01); *G06F 8/65* (2013.01)

(58) Field of Classification Search
USPC .......................................................... 706/12
See application file for complete search history.

(56) References Cited

U.S. PATENT DOCUMENTS

| | | | |
|---|---|---|---|
| 6,983,266 B1* | 1/2006 | Goldschmidt | G06N 5/043 706/46 |
| 8,001,407 B2 | 8/2011 | Malone et al. | |
| 8,095,486 B2 | 1/2012 | Chen et al. | |
| 8,102,987 B2* | 1/2012 | Agapi | H04M 3/4285 348/14.01 |
| 8,214,402 B2 | 7/2012 | Bruno et al. | |
| 8,234,241 B2* | 7/2012 | Kratz | G06F 16/2454 707/608 |
| 8,380,484 B2* | 2/2013 | Davis | G10L 13/033 379/202.01 |
| 8,713,565 B2 | 4/2014 | Ashok et al. | |

(Continued)

OTHER PUBLICATIONS

ACM Digital Library Learning Feature-Parameter Mappings for Parameter Tuning via the Profile Expected Improvement, Jakob Bossek, Bernd Bischl, Tobias Wagner, Gunter Rudolph GECCO '15 Proceedings of the 2015 Annual Conference on Genetic and Evolutionary Computation pp. 1319-1326 Madrid, Spain Jul. 11-15, 2015.*

(Continued)

*Primary Examiner* — Michael B Holmes
(74) *Attorney, Agent, or Firm* — Cantor Colburn LLP; Teddi Maranzano (57) ABSTRACT

A method, system, and computer program product for performing cognitive-based dynamic tuning of a software-based system include monitoring live operation of the system, and determining whether tuning is needed based on the monitoring. Analyzing information and suggesting a change in one or more parameters is based on the determining, the information including an output of a learning algorithm that learns an effect of changes in one or more of the one or more parameters on performance of the system.

17 Claims, 4 Drawing Sheets

(56) References Cited

U.S. PATENT DOCUMENTS

| | | | |
|---|---|---|---|
| 8,768,878 B2* | 7/2014 | Crupi | G06F 16/21 707/602 |
| 8,775,947 B2* | 7/2014 | Martinez | G06F 3/0486 715/748 |
| 8,805,800 B2 | 8/2014 | Narasayya et al. | |
| 8,910,189 B2 | 12/2014 | Iyengar et al. | |
| 8,914,300 B2 | 12/2014 | Sustaeta et al. | |
| 8,965,541 B2* | 2/2015 | Martinez | A63B 71/0619 700/90 |
| 9,092,395 B2* | 7/2015 | Bradfield | G06F 11/20 |
| 9,690,469 B2* | 6/2017 | Martinez | G06F 3/0486 |
| 9,785,220 B2* | 10/2017 | Eltawil | G06F 1/3275 |
| 9,998,199 B2* | 6/2018 | Learned | H04B 7/086 |
| 10,057,220 B2* | 8/2018 | Martinez | H04L 63/0442 |
| 10,121,513 B2* | 11/2018 | Martinez | G11B 27/036 |
| 2003/0065986 A1 | 4/2003 | Fraenkel et al. | |
| 2007/0094263 A1 | 4/2007 | Tessman, Jr. et al. | |
| 2008/0155074 A1 | 6/2008 | Bacinschi | |
| 2009/0240802 A1 | 9/2009 | Shankar | |
| 2012/0221075 A1* | 8/2012 | Bentwich | A61B 5/0476 607/45 |
| 2012/0324097 A1 | 12/2012 | Myers et al. | |
| 2014/0289245 A1 | 9/2014 | Deshpande et al. | |
| 2015/0026108 A1 | 1/2015 | Portegys et al. | |
| 2015/0311971 A1* | 10/2015 | Learned | H04B 7/086 370/329 |
| 2017/0200091 A1* | 7/2017 | Britton | G06N 99/005 |
| 2017/0245777 A1* | 8/2017 | K Seler Andersen et al. A61B 5/04004 | |

OTHER PUBLICATIONS

A statistical learning based approach for parameter ne-tuning of metaheuristics, Laura Calveta, Angel A. Juana, Carles Serratb, Jana Riesc Journal of Computers & Industrial Engineering May 27, 2016 pp. 1-33.*

ACM Digital Library Design and Performance Evaluation of Data Dissemination Systems for Opportunistic Networks Based on Cognitive Heuristics Marco Conti, Matteo Mordacchini, Andrea Passarella, ACM Transactions on Autonomous and Adaptive Systems (TAAS) TAAS Homepage archive vol. 8 Issue 3, 20113 pp. 1-32.*

IEEE An Incremental Type-2 Meta-Cognitive Extreme Learning Machine, Mahardhika Pratama; Guangquan Zhang; Meng Joo Er; Sreenatha Anavatti IEEE Transactions on Cybernetics ( vol. 47, Issue: 2, Feb. 2017) pp. 339-353.*

Journal of Computers, vol. 7, No. 9, Sep. 2012 Parameter Auto-tuning Method Based on Selflearning Algorithm Chaohua Ao Jianchao Bi 2012 Academy Publisher pp. 1-8.*

Dynamic Protocol Tuning Algorithms for High Performance Data Transfers Engin Arslan, Brandon Ross, and Tevk Kosar 2013 pp. 1-12.*

ACM Digital Library Tuning of Multiple Parameter Sets in Evolutionary Algorithms Martin Andersson Sunith Bandaru Amos H.C. Ng Proceeding GECCO '16 Proceedings of the Genetic and Evolutionary Computation Conference 2016 pp. 533-540 2016.*

ACM Digital Library Dynamic parameter choices in evolutionary computation Carola Doerr CNRS and Sorbonne University, Paris, France Proceeding GECCO '18 Proceedings of the Genetic and Evolutionary Computation Conference Companion pp. 800-830.*

Fursin et al., "Milepost GCC: machine learning enabled self-tuning compiler", International Journal of Parallel Programming, Jun. 2011, vol. 39, Issue 3, pp. 1-31.

Romano et al., "Cloud-TM: Transactional, Object-oriented, Self-tuning Cloud Data Store", Technical Report RT/13/2014, May 2014, pp. 1-20.

* cited by examiner

COGNITIVE-BASED DYNAMIC TUNING

BACKGROUND

The present invention relates to system performance tuning, and more specifically, to cognitive-based dynamic tuning.

Software-based systems require time-consuming tuning operations prior to live deployment. The tuning operations set parameters of the system to appropriate values for expected loads to achieve performance, throughput, response time, and capacity that minimize outages, critical situations, and customer dissatisfaction. The countless and ever-increasing software-based systems include autopilot, guidance, and landing systems in aircraft, navigation and self-parking systems in automobiles, online banking applications, and other consumer applications as examples. Some applications (e.g., airplane landing system, online banking application) may have tighter tolerances on the speed and accuracy of operations than other, less critical applications (e.g., offline backup). Because of scheduling pressures, tuning activities may often be reduced or omitted prior to the deployment of many systems.

SUMMARY

Embodiments include a method, system, and computer program product for performing cognitive-based dynamic tuning of a software-based system. Aspects include monitoring live operation of the system; determining whether tuning is needed based on the monitoring; and analyzing information and suggesting a change in one or more parameters based on the determining, the information including an output of a learning algorithm that learns an effect of changes in one or more of the one or more parameters on performance of the system.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, proper tuning of software-based systems can avoid outages and critical situations, but comprehensive tuning activities are often abbreviated or neglected because of scheduling concerns or lack of personnel to perform the tuning. Additionally, because existing tuning activities tune systems for a specific load, even a well-tuned system may experience issues when infrastructure workloads change. For example, a software-based banking system may be tuned for high user-transaction workloads but not be tuned for the different workloads associated with running batch jobs during off-peak hours. Previous solutions to improperly tuned systems have included the addition of hardware. However, this additional hardware results in increased maintenance, costs associated with obtaining, incorporating, and powering the hardware. Embodiments of the systems and methods detailed herein relate to cognitive-based dynamic tuning based on historical and continuous learning.

Figure 1:
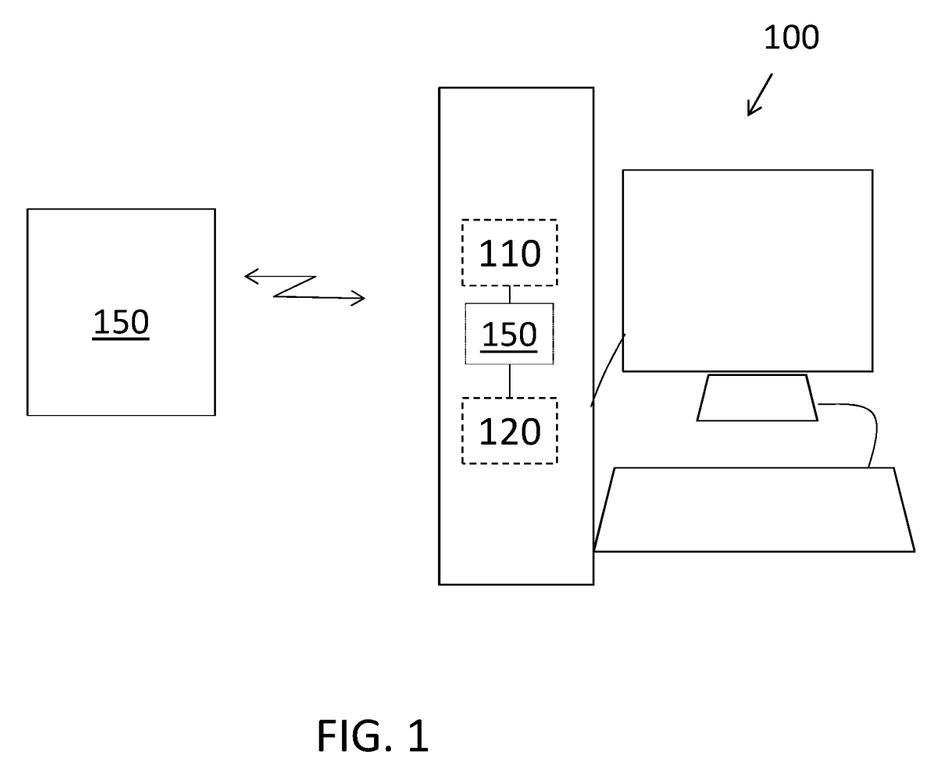
FIG. 1 is a block diagram of a cognitive-based dynamic tuning system according to embodiments of the invention.

FIG. 1 is a block diagram of a dynamic tuning system 100 according to embodiments of the invention. As noted above and discussed further below with reference to FIGS. 3-4, the tuning system 100 is a processing system that may be implemented on any platform (e.g., Java™ Virtual Machine (JVM), cloud environment, computer, mobile platform). The tuning system 100 includes one or more memory devices 110 and one or more processors 120. The dynamic tuning system 100 and the software-based system 150 that it tunes may share processors 120 and memory devices 110 or the tuning system 100 may be in communication with the system 150 that it tunes, as shown in FIG. 1. The tuning system 100 includes additional known components that perform functions such as, for example, obtaining input from an operator or providing suggestions or information, and the functions that must be tuned (e.g., a banking application, an autopilot application). The memory device 110 stores instructions implemented by the processor 120. As further discussed below, these instructions include processes used to perform the tuning (in addition to the tuned application itself, according to an embodiment). According to the embodiments detailed below, the memory device 110 may additionally store the directives detailed below.

Figure 2:
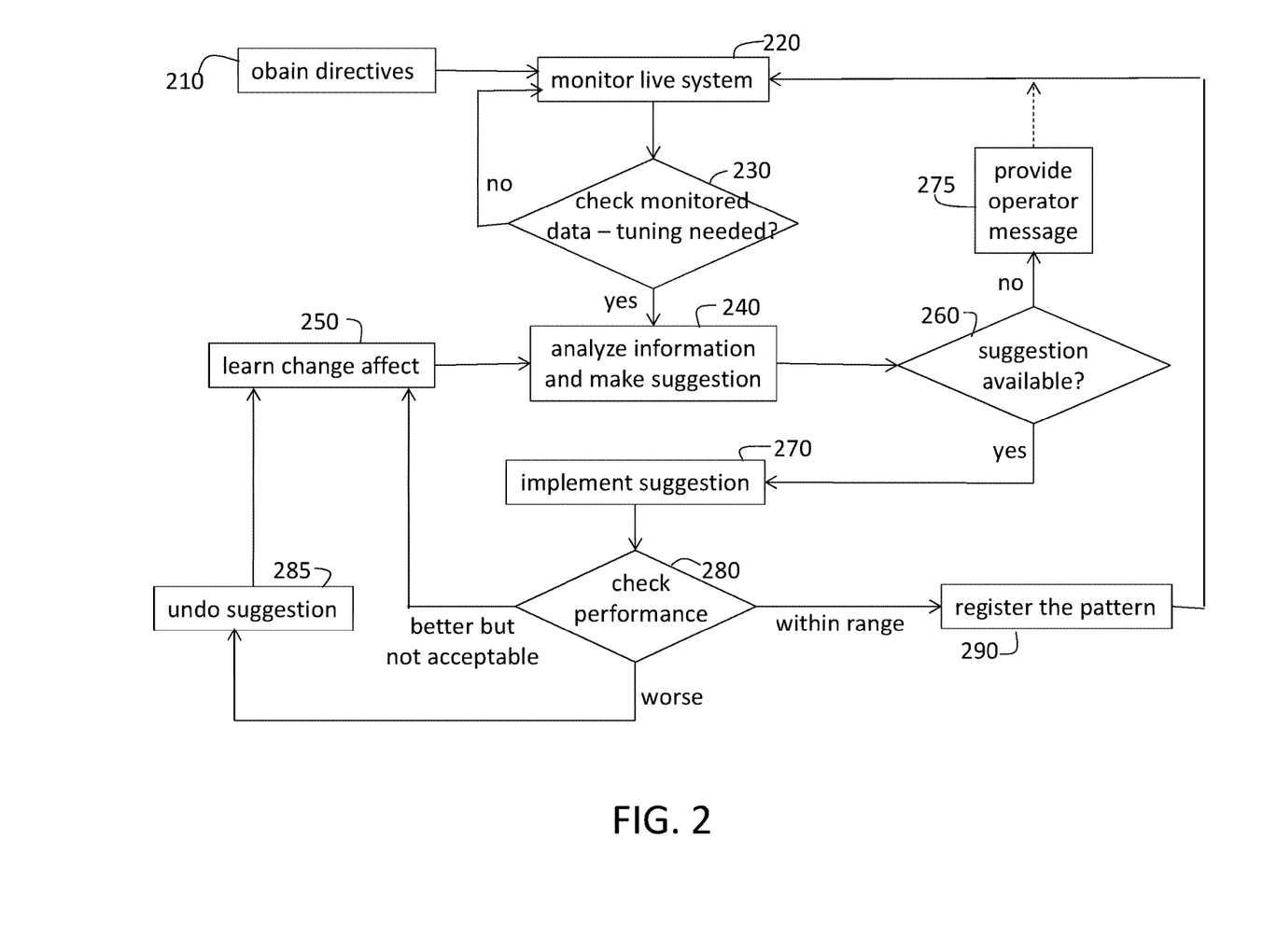
FIG. 2 is a process flow of a method of performing tuning according to embodiments of the invention.

FIG. 2 is a process flow of a method of performing cognitive-based dynamic tuning according to embodiments of the invention. The processes are performed by the system 100 to tune the system 150. At block 210, directives are obtained to initiate the system 100. Monitoring the live system 150, at block 220, refers to monitoring performance indicators of the software-based system 150 that may require tuning. At block 230, one or more of the monitored indicators may be checked against a range of acceptable values to determine if the system 150 needs to be tuned. If the system 150 is found to be performing within acceptable range (at block 230), monitoring of the live system 150 is resumed (at block 220). If the system 150 is found not to be performing within acceptable range (at block 230), then the cognitive-based dynamic tuning process according to embodiments detailed herein is commenced at block 240. At block 240, analyzing information and making a suggestion includes consulting operational directives, learned patterns at block 250 (if any), using historical information, and real-time diagnostic information to suggest an action to adjust parameters. The processing at block 250 includes a learning algorithm re-learning or updating patterns of parameters that improve system 150 performance. Based on the re-learning at block 250, the suggestions at block 240 can adjust to changes in loads and other conditions that affect performance of the system 150. The suggestion from block 240 is checked, at block 260, to determine if the suggested action is available or possible. If it is, the processes include implementing the suggestion at block 270. If the suggested action is not available for implementation (based on checking at block 260), the processes include providing the operator with a message at block 275. When the suggested action is executed (at block 270), the real-time performance is checked at block 280. If the performance of the system 100 is now within the acceptable range, registering the pattern, at block 290, includes storing the pattern of parameters implemented (at block 270) according to the suggestion (at block 240). If the performance is improved but still not within acceptable range (based on the check at block 280), then the information is provided to block 250. If the performance is degraded rather than improved (based on the check at block 280), then the suggestion in undone (parameters are set back to their values prior to implementation at block 270), and the information is provided to block 250. From block 250, the analysis and suggestion process (at block 240) is repeated. Each of the processes show in FIG. 2 and summarized above is discussed further below.

At block 210, obtaining directives refers to two different types of directives. Product base directives are initial parameter values for the system 150. These initial parameters may be associated with a specified mode. That is, more than one set of initial parameter values may be stored, and each set may be associated with a mode of operation of the system 150. Exemplary modes include a test mode and production mode. Mode selection and, thus, selection of the set of initial parameter values may be done by operator input. Whether the tuning system 100 and the system 150 are within the same housing or not (according to the two embodiments shown in FIG. 1), the product base directives are needed by both the tuning system 100 and the system 150 that is being initialized. Operational directives are policies that govern the tuning process and are needed by the tuning system 100. Operational directives may set limits on the step values for changes and total deviations in parameter values, for example. Operational directives, like product base directives, may differ based on the selected mode. For example, changes to parameter values may be less limited in test mode than in live or production mode. Product base directives (associated with one or more modes) may be established by a system 150 manufacturer without knowledge of the specific environment in which the system 150 will be used (e.g., the specific load characteristics, power considerations).

For example, the developer or manufacturer of a banking system 150 may establish a single set of product base directives to initialize each of several systems 150 deployed to a number of different sites. A local administrator at one of the sites (banks) may establish the operational directives for the system 100 that tunes the banking system 150 at that site. According to an alternate embodiment, the local administrator may establish two sets of operational directives. One set of operational directives may pertain to an offline test mode, and the other set of operational directives may pertain to a live mode. The operational directives associated with the test mode may be instantiated by the local administrator during initial setup of the system 150 and during offline tuning, for example. In the test mode, the operational directives may give a wide latitude for changing parameters to achieve the best performance without regard for some of the changes resulting in temporary outages or delays, for example. According to one embodiment, no operational directives may be issued in test mode. That is, the system 100 may be allowed to tune the system 150 without limitations to achieve optimal performance. The operational directives governing the tuning by the system 100 during live mode may be instantiated by the local administrator during use of the system 150 by customers, for example. The operational directives in live mode may limit changes to one or more parameters to ensure that basic system 150 functionality is maintained during the tuning process. For example, operational directives in test mode may set no limitations on a JVM heap size that the system 100 may set, but operational directives in live mode may limit the increase in maximum heap size set by the system 100. This is because an increase in maximum heap size is accompanied by an increase in operation of the garbage collection (GC) mechanism, which then might increase response time. Thus, the operational directives in live mode may include a limitation that heap size may only be increased by, for example, 1% of the starting maximum. The operational directives in live mode may additionally specify that maximum heap size may not be increased at all if GC operation time is more than 8% of the total system (150) time.

The monitoring, at block 220, generally refers to the system 100 monitoring indicators of system 150 response time and resource utilization. Indicators that may be monitored include the central processing unit (CPU) (e.g., percentage of CPU usage), error logs, memory usage, system 150-specific parameters like response time, and other indicators of performance of the system 150. Checking monitored data to see if tuning is needed, at block 230, includes determining if one or more monitored indicators are within acceptable range. For example, error logs may be monitored (at block 220) and checked (at block 230) continuously such that an indication of an "out of memory error" condition in a log could be found immediately. As another example, by monitoring system 150 response time (at block 220) and checking it against a maximum response time threshold value (at block 230), another criteria for tuning the system 150 may be identified. In the exemplary case of a banking system, the local administrator may have set a maximum response time threshold for providing web access to online banking as 4 seconds. If the monitored response time (at block 220) is found to be greater than 4 seconds (at block 230), then tuning (starting at block 240) may be started. The specific indicators that are monitored by the system 100 may differ from one system 150 to another. For example, while it may be critical to monitor satellite signal acquisition time in a dynamically tuned car navigation system 150, it may instead be important to monitor response time to a customer request for data in a dynamically tuned banking system 150. The checking of monitored indicators (at block 230) may be done according to administrator-specified conditions. The checking, at block 230, may be performed continuously periodically, or irregularly based on an event, and the checking of different indicators may be done differently, as in the examples above, based on administrator specifications. An exemplary event may be an outage or a certain amount of monitoring data being acquired, for example. A more critical system 150 may benefit from continually checking one or more of the monitored indicators at block 230, while a less critical system 150 may only tolerate the resource cost associated with the checking (at block 230) and the tuning process when there is an outage.

Analyzing information, at block 240, includes analyzing the logs that are maintained for all system errors and memory errors of the system 150 and real-time information (i.e., monitored information from block 230), historical data that is stored and also most recently provided to block 250, the currently applicable operational directives (at block 210), and the latest learning outcome from block 250. The real-time information may include, for example, thread count, used heap memory, and GC activities in the case of a JVM platform. The information from block 250 includes parameter combinations that may improve performance. All of this information is used at block 240, in addition to operational directives (obtained at block 210), by one or a combination of a machine learning algorithm, look-up table, and a set of rules to generate a suggestion. The processing at block 240 may result in more than one suggestion. That is, a list of scored suggestions may be output at block 240.

For example, the system 150 may be implemented on a Java Virtual Machine (JVM). In the example, performance was not within the acceptable range (at block 230) due to processing time (the system 150 is sluggish), and the logs (analyzed at block 240) indicate an out of memory error. This may result in one or more suggestions individually scored at block 240. The out of memory error is generally caused by a high number of objects in JVM. Thus, the highest scored suggestion, based on a rule (at block 240) that out of memory error should result in adjustment of the heap size, the system 100 may suggest an increase in maximum heap size of system 150. The amount by which the system 100 suggests that heap size be increased is based on the operational directives (obtained at block 210). At block 260, checking to see if the suggestion is implementable or possible is done according to the suggestion. In the above example of a suggested increase in heap size, the check (at block 260) would involve verifying available memory to see if such an increase is possible. If the highest scored suggestion from block 240 is determined not to be possible (at block 260), then the next scored suggestion (if it exists) is evaluated. Otherwise, a message provided to the operator or local administrator (at block 275) advises the operator that additional system 150 resources are needed to further increase the capacity of the system 150. Monitoring the live system 100 (at block 220) may resume after the message is provided, as shown in FIG. 2. Also, in the example, after the message is provided to administrator (at block 275), further out of memory errors detected by the checking at block 230 may be ignored for a period specified by the operator or local administrator in the operational directives. This would prevent the system 210 from re-issuing the same message (at block 275) repeatedly for the same situation.

When a suggestion from the system 100 for an adjustment of one or more parameters of the system 150 is implemented (at block 270), performance of the system 150 is rechecked (at block 280). From block 280, processing may continue in one of three different ways. If the performance of the system 150 is within acceptable range after the suggested parameter change is implemented (at block 270), then the parameter (or parameters) value is registered, at block 290, before resuming monitoring of the live system 150 at block 220. This registered information (at block 290) may update the learning algorithm at block 250, the historical information used by block 240, or both. If the check at block 280 indicates that performance has improved but not enough to be within acceptable range, then this information is provided to block 250 for re-learning. This parameter value or pattern of parameters may be tried in the future because it caused an improvement in performance. On the other hand, if the check at block 280 indicates that performance has degraded, the changes implemented at block 270 are undone at block 285, and the information is provided to block 250. This particular suggested change may not be tried (for the same exact system status, parameters combination, and workload) in the future based on the re-learning at block 250. That is, the information provided to block 250 is used to update the learning algorithm, and may, in turn, teach the learning algorithm or adjust a look-up table, or other mechanism used to generate the suggestion (at block 240). The learning at block 250 and the analysis at block 240 facilitates updating of the tuning system 100 when loads and other operating conditions change. For example, previously effective changes to parameter values (for a previous load) suggested at block 240 may be recorded (as a result of the check at block 280) as no longer satisfying performance requirements (at block 250). One non-limiting example involves an online shopping application. On the Monday after Thanksgiving, a traditionally busy online shopping day, the monitoring (at block 220) and checking (at block 230) may determine that transaction time is above a predetermined threshold value.

If the exemplary system 150 were implemented on a JVM, the initial suggested solution (at block 240) could be to increase heap size by 5%. However, because increasing heap size results in increased GC activity, response time may increase rather than decrease. One of the things that may happen in this situation is that the operational directives may be adjusted by the local administrator in recognition of the increased load such that heap size increase is limited to no more than 1% (i.e., the initial suggestion at block 240 is limited). Another thing that may happen, in the absence of an adjustment in the operational directives is that consultation of historical data at block 240 may indicate that a large increase (as high as 5%) may not improve performance afterall. Yet another thing that may happen in the absence of an adjustment in the operational directives is that an initially suggested 5% may be implemented. In this case, based on degraded response time (as checked at block 280), the suggestion would be undone (at block 285) and the learning algorithm at block 250 would learn that a 5% increase in maximum heap size is a bad suggestion given the particular tuning parameters, available resources, and specific work load characteristics of the system 150. In the subsequent iteration, the suggestion at block 240 may be a smaller increase in heap size or a different suggestion.

As noted above, the tuning system 100 may be embodied in a cloud computing environment or any other platform. Cloud computing is further discussed below. Again, it is understood in advance that although this disclosure includes a detailed description on cloud computing, implementation of the teachings (tuning system 100) recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
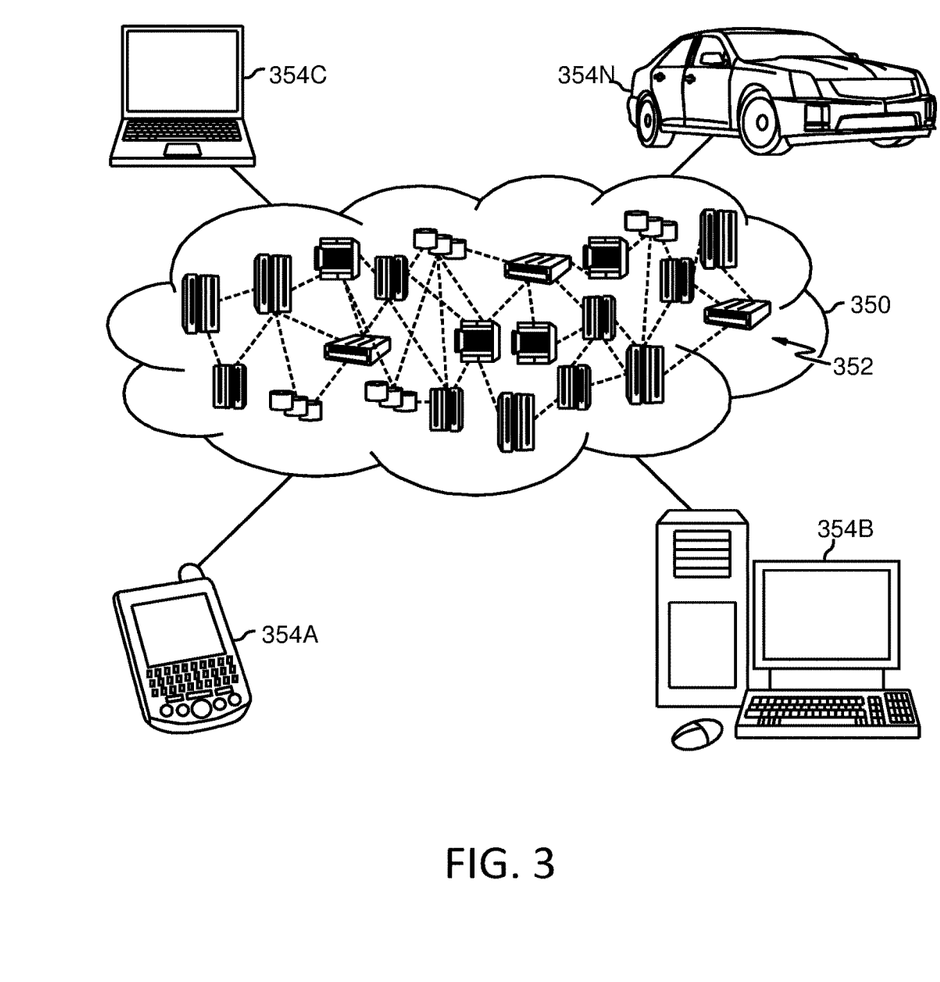
FIG. 3 depicts a cloud computing environment according to some embodiment of this disclosure.

Referring now to FIG. 3, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 352 and cloud computing environment 350 can communicate with any type of computerized device over any type of network and/or network addressable connection (e.g., using a web browser).

Figure 4:
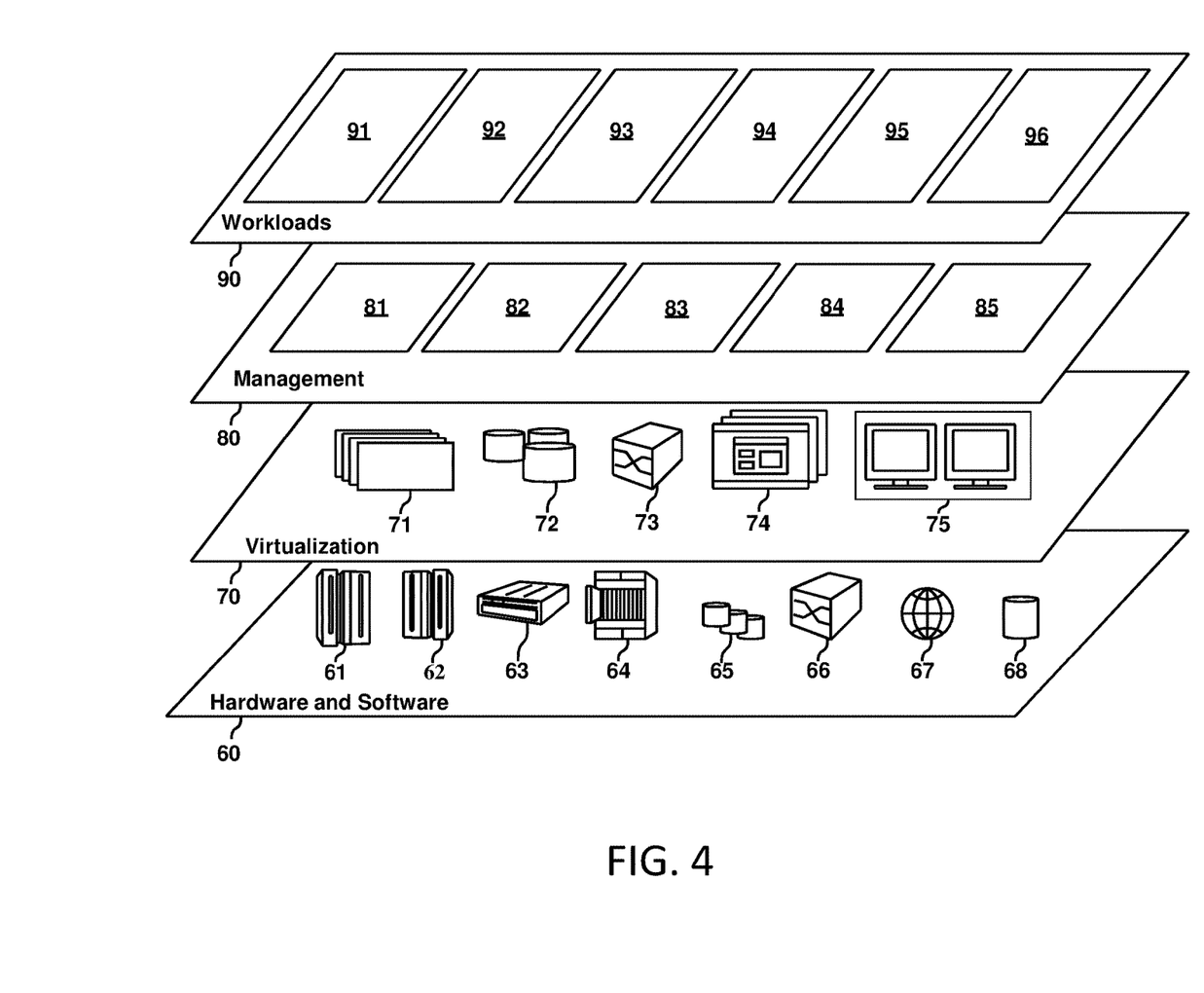
FIG. 4 depicts abstraction model layers according to some embodiments of this disclosure.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and an image processing and object location processing 396.

Technical effects and benefits of some embodiments include the ability to dynamically tune a software-based system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing cognitive-based dynamic tuning of a software-based system, the method comprising:
   monitoring, using a processor, live operation of the system;
   determining whether tuning of the system is needed based on the monitoring;
   analyzing information and suggesting a change in one or more parameters of the system based on the determining using the processor, the information including an output of a learning algorithm that learns an effect of changes in one or more of the one or more parameters on performance of the system; and
   implementing the change in the one or more parameters of the system and checking the performance of the system based on the suggesting the change in the one or more parameters.

2. The computer-implemented method according to claim 1, further comprising determining if the change in the one or more parameters is possible prior to the implementing the change.

3. The computer-implemented method according to claim 2, further comprising providing a message to a local system administrator when the change in the one or more parameters is not possible.

4. The computer-implemented method according to claim 1, further comprising the learning algorithm learning the effect of the change in the one or more parameters on the performance of the system.

5. The computer-implemented method according to claim 1, further comprising undoing the change in the one or more parameters based on the checking indicating that the performance of the system is degraded based on the change.

6. The computer-implemented method according to claim 1, wherein the analyzing the information and the suggesting the change include analyzing operational directives set by an administrator that limit the change in the one or more parameters.

7. The computer-implemented method according to claim 1, wherein the analyzing the information includes analyzing historical information and real-time information about the performance of the system.

8. A system to perform cognitive-based dynamic tuning, the system comprising:
   a memory device configured to store operational directives set by an administrator; and
   a processor configured to monitor live operation of the system, determine whether tuning of the system is needed based on the monitoring, and analyze information and suggest a change in one or more parameters of the system based on determining that the system requires tuning, the information including an output of a learning algorithm that learns an effect of changes in one or more of the one or more parameters on performance of the system and the operational directives that limit the change in the one or more parameters, wherein the processor implements the change in the one or more parameters of the system and checks the performance of the system based on suggesting the change in the one or more parameters.

9. The system according to claim 8, wherein the processor determines if the change in the one or more parameters is possible prior to implementing the change, and provides a message to the administrator when the change in the one or more parameters is not possible.

10. The system according to claim 8, wherein the learning algorithm learns the effect of the change in the one or more parameters on the performance of the system.

11. The system according to claim 8, wherein the processor undoes the change in the one or more parameters based on the performance of the system being degraded based on the change.

12. The system according to claim 8, wherein the information includes historical information and real-time information about the performance of the system.

13. A computer program product for performing cognitive-based dynamic tuning of a software-based system, the computer program product comprising a computer readable storage medium having program instructions embodied therewith, the program instructions executable by a processor to perform a method comprising:

monitoring live operation of the system;

determining whether tuning of the system is needed based on the monitoring;

analyzing information and suggesting a change in one or more parameters of the system based on the determining, the information including an output of a learning algorithm that learns an effect of changes in one or more of the one or more parameters on performance of the system; and implementing the change in the one or more parameters of the system and checking the performance of the system based on the suggesting the change in the one or more parameters.

14. The computer program product according to claim 13, further comprising determining if the change in the one or more parameters is possible prior to the implementing the change and providing a message to a local system administrator when the change in the one or more parameters is not possible.

15. The computer program product according to claim 13, further comprising the learning algorithm learning the effect of the change in the one or more parameters on the performance of the system.

16. The computer program product according to claim 13, further comprising undoing the change in the one or more parameters based on the checking indicating that the performance of the system is degraded based on the change.

17. The computer program product according to claim 13, wherein the analyzing the information and the suggesting the change include analyzing operational directives set by an administrator that limit the change in the one or more parameters, and the analyzing the information further includes analyzing historical information and real-time information about the performance of the system.

* * * * *